United States Patent
Thomas (12) United States Patent (10) Patent No.: US 6,515,488 B1
Thomas (45) Date of Patent: Feb. 4, 2003

(54) FINGERPRINT DETECTOR WITH SCRATCH RESISTANT SURFACE AND EMBEDDED ESD PROTECTION GRID

(75) Inventor: Danielle A. Thomas, Dallas, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/850,244

(22) Filed: May 7, 2001

(51) Int. Cl.[7] ................................................ G01R 27/26
(52) U.S. Cl. ............................................................ 324/662
(58) Field of Search .................................. 324/658, 661, 324/662, 635, 644, 671, 716; 340/870.37

(56) References Cited

U.S. PATENT DOCUMENTS

| | | | |
|---|---|---|---|
| 4,446,476 A | * 5/1984 | Isaac et al. | ...... 357/67 |
| 5,240,801 A | * 8/1993 | Hayashi et al. | ...... 430/57 |
| 5,314,843 A | 5/1994 | Yu et al. | ...... 437/225 |
| 5,328,553 A | 7/1994 | Poon | ...... 156/636 |
| 5,693,565 A | * 12/1997 | Camilletti et al. | ...... 437/192 |
| 5,773,890 A | 6/1998 | Uchiyama et al. | ...... 257/753 |
| 5,786,275 A | 7/1998 | Kubo | ...... 438/692 |
| 5,935,733 A | * 8/1999 | Scott et al. | ...... 430/5 |
| 6,008,119 A | 12/1999 | Fournier | ...... 438/633 |
| 6,022,265 A | 2/2000 | Drill et al. | ...... 451/56 |
| 6,027,997 A | 2/2000 | Yu et al. | ...... 438/633 |
| 6,046,099 A | 4/2000 | Cadien et al. | ...... 438/622 |
| 6,087,253 A | 7/2000 | Liaw | ...... 438/648 |
| 6,114,862 A | 9/2000 | Tartagni et al. | ...... 324/662 |
| 6,124,189 A | 9/2000 | Watanabe et al. | ...... 438/586 |
| 6,191,050 B1 | 2/2001 | Andideh | ...... 438/759 |
| 6,203,417 B1 | 3/2001 | Dyer et al. | ...... 451/548 |

OTHER PUBLICATIONS

European Search Report, Aug. 2, 2002, EP 02 25 3138.
Veridicom FPS200 Silicon Fingerprint Sensor XP–002208516, Aug. 2000.

* cited by examiner

*Primary Examiner*—Christine Oda
*Assistant Examiner*—Etienne P LeRoux
(74) *Attorney, Agent, or Firm*—Lisa K. Jorgenson; Peter J. Thoma

(57) ABSTRACT

A fingerprint detector having a smooth sensor surface for contact with a fingerprint includes capacitive sensor plates defining an array of sensor cells below the sensor surface and tungsten ESD protection grid lines surrounding each sensor cell. The sensor surface is defined by silicon carbide and includes silicon oxide filling cavities in the silicon carbide. The cavities inherently result from processing steps, including removal of the tungsten atop the silicon carbide that is used to define the grid lines. Filling the cavities with oxide and smoothing the surface using chemical mechanical polishing provides a scratch-resistant surface and improves the sensitivity of the capacitive sensor cells.

10 Claims, 6 Drawing Sheets

FINGERPRINT DETECTOR WITH SCRATCH RESISTANT SURFACE AND EMBEDDED ESD PROTECTION GRID

BACKGROUND OF THE INVENTION

The present invention relates generally to semiconductor fingerprint detectors, and more particularly to improvements in the structure of a fingerprint detection surface used on a fingerprint detector device, and its method of manufacture.

Figure 1:
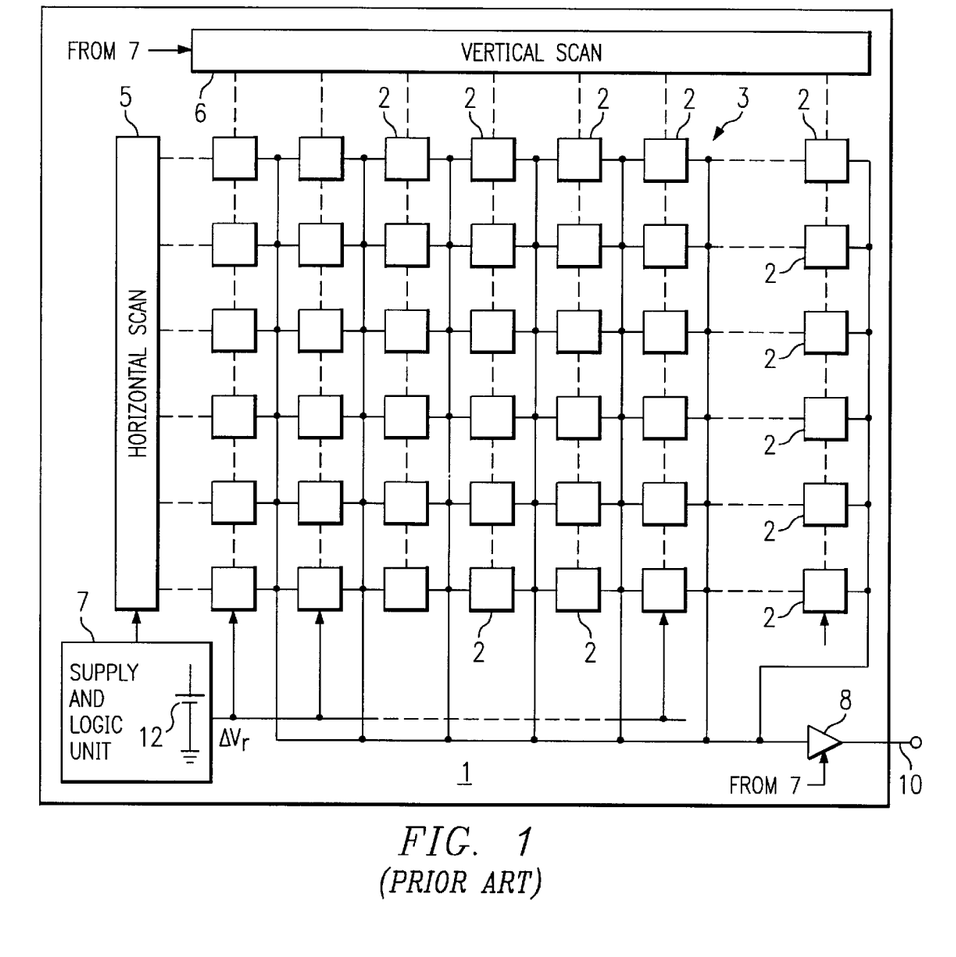
FIG. 1 is a block diagram of a prior art sensor device for which the present invention provides an improvement.
Figure 2:
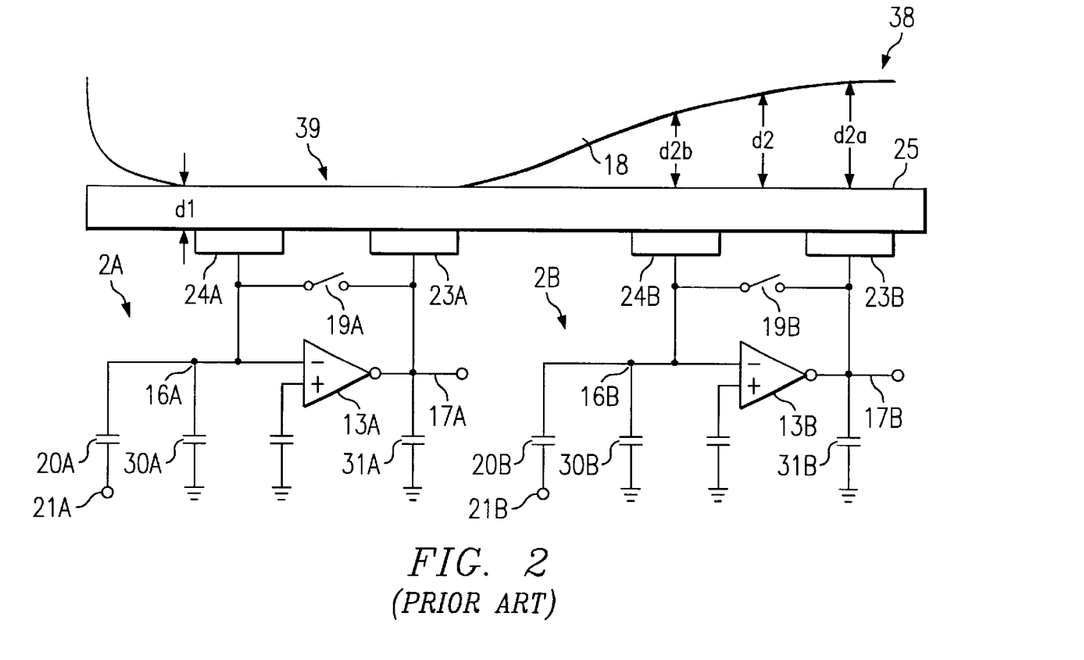
FIG. 2 in enlarged schematic side view of a small portion of a finger positioned above two adjacent sensor cells of the device of FIG. 1.

A capacitive distance sensor is disclosed in commonly-assigned U.S. Pat. No. 6,114,862, the disclosure of which is hereby incorporated by reference. The capacitive distance sensor disclosed in this patent is particularly useful in semiconductor fingerprint detectors. The present invention provides an improvement in the structure of the surface that is provided for contact with the fingerprint of the user. FIGS. 1 and 2 herein correspond to FIGS. 1 and 4 of U.S. Pat. No. 6,114,862, and are briefly described below to facilitate an understanding of the present invention.

BRIEF DESCRIPTION OF THE DRAWINGS

In the cross-sectional views of FIGS. 3–8, 11 and 12, conductive portions are cross-hatched and non-conductive portions are left without cross-hatching for clarity of illustration.

THE PRIOR ART DEVICE AND FABRICATION PROCESS

FIG. 1 shows a sensor device 1 for sensing a distance between the sensor device and an object, such as a finger. The sensor device 1 includes a number of cells 2 arranged to form an array 3 and each constituting an elementary sensor. The simplicity of the individual cells 2 enables the sensor device 1 to be implemented in integrated form on a single semiconductor chip.

The sensor device 1 also comprises a horizontal scanning stage 5 and a vertical scanning stage 6 for enabling one of the cells 2 at a time according to a predetermined scanning pattern. The stages 5 and 6 enable the outputs of the cells to be read using shift registers, address decoders, or other suitable circuitry.

The sensor device 1 also comprises a supply and logic unit 7, which supplies the circuit elements of the device with power (including the cells 2), feeds the necessary reference voltages, and controls the timing of device operations. FIG. 1 shows that the supply and logic unit 7 includes a voltage source 12. A buffer 8 is interconnected with the outputs of all the cells 2, and includes an output 10 for sequentially generating signals corresponding to the outputs of the cells 2 according to the sequence in which they are enabled by scanning the stages 5, 6.

FIG. 2 shows the details of two adjacent cells 2A and 2B with a skin surface portion 18 of a human finger positioned thereover. The elements of each of these two cells bear the designators A or B but are essentially identical, as will now be described. Each cell 2 preferably comprises a low-power inverting amplifier 13 having an input 16 and an output 17, which also defines the output of individual cell 2. Each cell 2 also preferably includes first and second coplanar capacitor plates 23 and 24, positioned facing the skin surface 18 of the finger being printed. The plates 23, 24 are covered with a dielectric layer 25 that covers the face of the integrated sensor device 1, including the entire array 3 of cells 2. A reset switch 19 is connected between the input 16 and output 17 of the inverting amplifier 13. An input capacitor 20 is connected between an input 21 of the cell 2 and the input 16 of the inverting amplifier 13. The input 16 of the inverting amplifier 13 also has an equivalent input capacitance depicted by capacitor 30. Likewise, the output 17 has an equivalent output capacitance depicted by capacitor 31.

The skin surface 18 includes a ridge 39 adjacent to the first cell 2A and a valley 38 adjacent to the second cell 2B. As a result, the first and second cells 2A, 2B will each produce different capacitive coupling responses in the sensor device 1. Accordingly, the first cell 2A will sense a smaller distance d1, signifying the ridge 39, than the second cell 2B, which senses a larger distance d2, signifying the valley 38. The distance d2 sensed by the second cell 2B will be the average of a distance d2$a$ between the first capacitor plate 23B and the portion of the skin surface 18 directly above the first capacitor plate 23B and a distance d2$b$ between the second capacitor plate 24B and the portion of the skin surface 18 directly above the second capacitor plate 24B. From a lumped-model point of view, this structure realizes a three-capacitor scheme that can sense the difference between a contacting member, a ridge, and a non-contacting member, a valley.

It will be appreciated that the durability of the top surface of the dielectric layer 25 is an important concern. The prior art device just described was provided with a thin silicon carbide layer on the upper surface. The final steps in the sequence of processing steps are illustrated in FIGS. 3–8, and will now be described briefly to highlight the improvement made by the present invention hereinafter disclosed.

Figure 3:
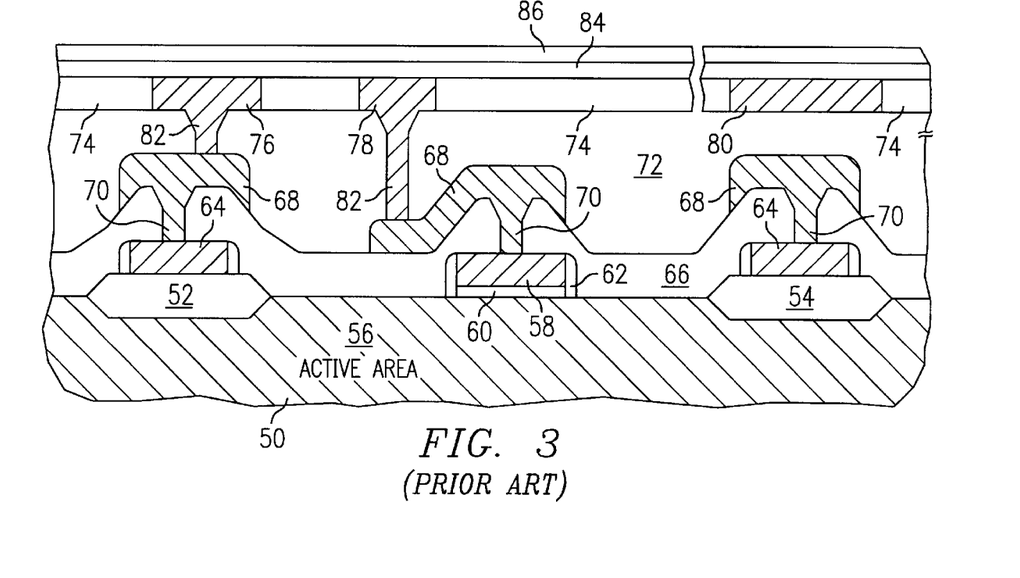
FIGS. 3–7 are chematic cross sections illustrating a sequence of conventional process steps for making the sensor device of FIG. 1.

FIG. 3 schematically illustrates one capacitive sensor cell and other common structures within the device. The device is fabricated on a conventional monocrystalline silicon substrate 50, the upper layer of which may be epitaxially formed. Relatively thick field oxide layers 52 and 54 define an active area 56 therebetween. The active area 56 is typical of many such active areas repeated throughout the device, which may include N-type or P-type regions (not shown) of conventional transistor elements.

The gate structure of a typical transistor is shown immediately above the active area 56, and includes a polysilicon gate 58, a thin gate oxide layer 60, and sidewall oxide spacers 62. Polysilicon interconnects 64, which are shown atop the field oxide layers 52 and 54, are used to interconnect other transistor elements (not shown) of the device.

Overlying the polysilicon gate 58 and polysilicon interconnects 64 is a relatively thick dielectric layer 66, which is preferably a doped oxide such as borophosphosilicate glass (BPSG). A first metalization layer defines metal interconnects 68 and vias 70 extending down through the BPSG layer 66 to contact the polysilicon gate 58 and polysilicon interconnects 64. Preferably, the metal used to define the interconnects 68 and vias 70 is primarily aluminum with traces of silicon (about 1.0%) and copper (about 0.5%). A very thin composite layer (not shown) of titanium and titanium nitride is interposed at each interface between each via 70 and the polysilicon material therebelow.

A planarized dielectric layer 72 covers the metal interconnects 68 and BPSG layer 66. Preferably, dielectric layer 72 is a composite of a lower undoped oxide, an intermediate spin-on-glass (SOG), and an upper undoped oxide. The lower undoped oxide is first deposited to a thickness of about 5500 Å, then the SOG is deposited to a thickness of about 6000 Å and etched back to provide a planarized surface, and then the upper undoped oxide is deposited to a thickness of about 5000 Å. Next, via openings are etched through the dielectric layer 72 and a second metalization step is performed. Then, the metal is patterned to define capacitor plates 76 and 78, a ground line 80, and vias 82 down to the interconnects 68. A further dielectric layer 74, preferably of hydrogen silsesquioxane (HSQ), is then deposited atop the SOG layer 72 between the metal plates 76 and 78 and the ground line 80.

The second metalization layer is preferably of the same primarily aluminum composition as the first metalization that defines the interconnects 68. The ground line 80 is connected to a ground pad (not shown) at the periphery of the semiconductor chip. The portion of the chip that includes the metal ground line 80 is shown broken away since it is actually located beyond the periphery of the array of capacitive sensor cells. Two additional dielectric layers are deposited atop the HSQ layer 74 and the portions of the second metalization layer embedded therein. These two additional dielectric layers preferably comprise a phosphosilicate glass (PSG) layer 84 and a silicon nitride ($Si_x N_y$) layer 86.

Figure 4:
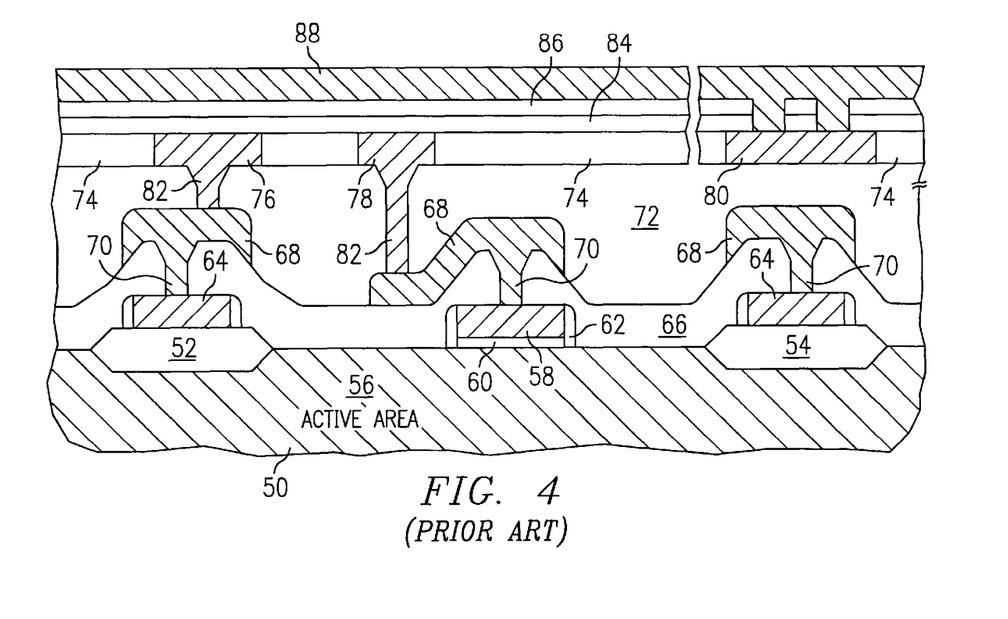

Now referring to FIG. 4, the fabrication process continues with the formation of a third metalization layer. Plug openings are etched through the dielectric layers 84 and 86 down to the aluminum ground line 80. A very thin film (not shown) of titanium nitride (TiN) is conformally deposited on the silicon nitride layer 86, on the walls within the plug openings through layers 84 and 86, and on the surface of the aluminum ground line 80 exposed inside the plug openings. Next, a tungsten (W) layer 88 is conformally deposited on the very thin titanium nitride film above the silicon nitride layer 86 and within the plug openings above the ground line 80.

Figure 5:
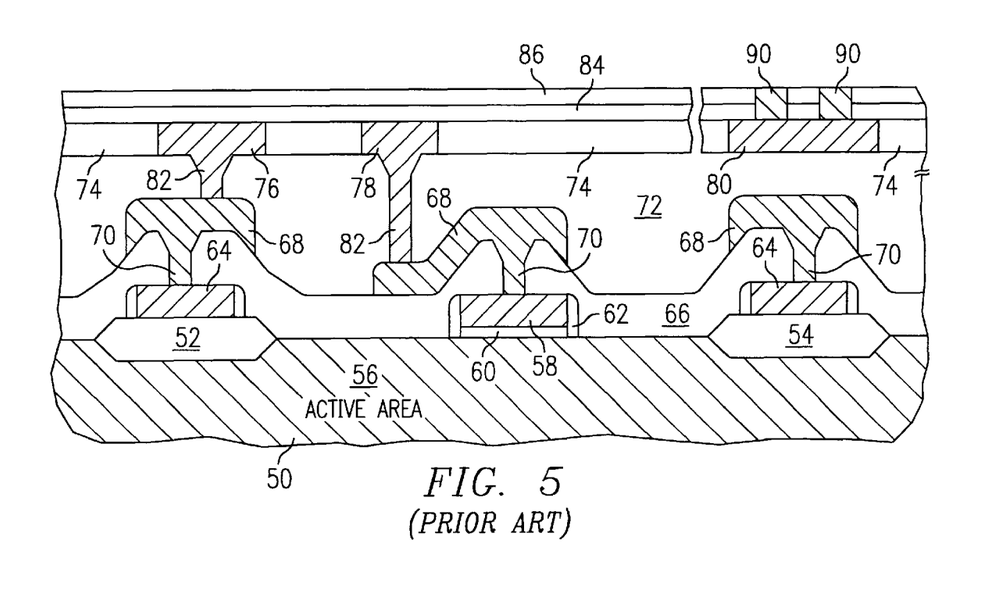

Now referring to FIG. 5, the structure is shown after etching back the tungsten layer 88 and underlying titanium nitride down to the surface of the silicon nitride layer 86. This leaves tungsten plugs 90 in place, which are electrically connected to the aluminum layer 80 through the very thin titanium nitride film. The surface of the silicon nitride layer 86 is left in a relatively rough state since the tungsten layer 88 (FIG. 4) has a strong columnar structure and etches back unevenly, the fastest etching occurring along grain boundaries. The roughness is transferred to the underlying titanium nitride film (not shown) and then to the silicon nitride layer 86 upon dry-etch removal of the titanium nitride.

As previously mentioned, the aluminum layer 80 is connected to a ground pad (not shown), which is located at the periphery of the device. The purpose of the tungsten plugs 90 is to provide an electrostatic discharge (ESD) path to ground from the top surface of the device when touched by an object, such as a human finger. The aluminum layer 80 is provided in a peripheral pattern, preferably along two or three sides of the array of sensor cells, with thousands of tungsten plugs 90 juxtaposed thereover.

Figure 6:
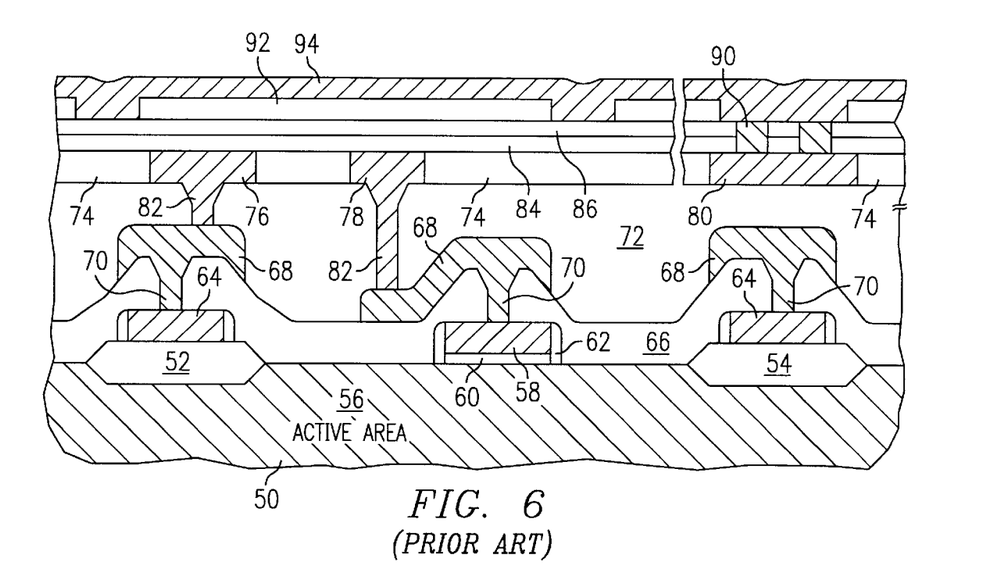

FIG. 6 shows the structure after several additional steps have been performed. A silicon carbide layer 92 is deposited on the silicon nitride layer 86 and atop the tungsten plugs 90. Some of the roughness of the silicon nitride layer 86 appears at the top surface of the silicon carbide layer 92. Then, the silicon carbide is patterned, using conventional photolithographic techniques, to open spaces around each sensor cell and over the tungsten plugs 90. Another thin film (not shown) of titanium nitride is conformally deposited on the silicon carbide layer 92 and within the spaces opened therethrough. Next, an additional tungsten metalization step is performed to provide tungsten layer 94 as shown.

Figure 7:
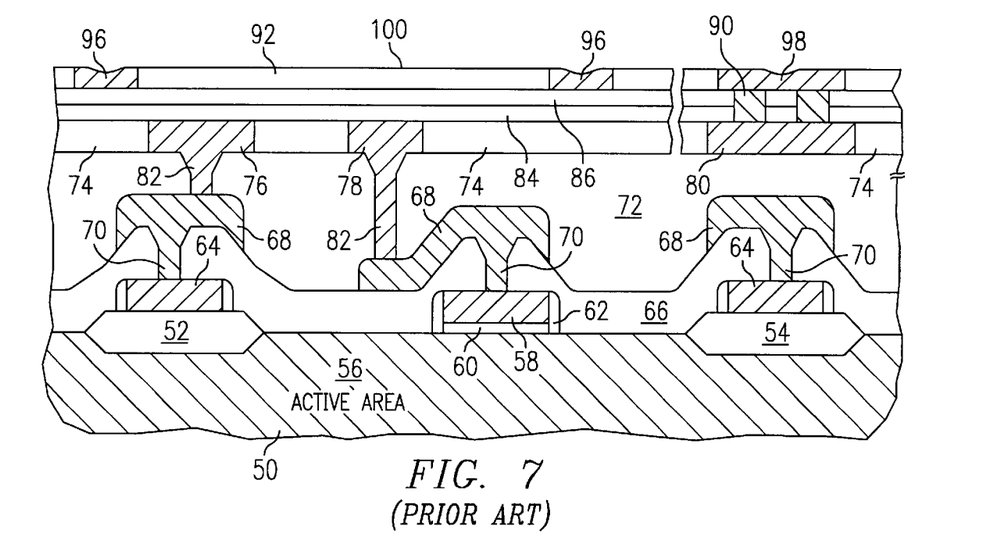

Next, with reference to FIG. 7, the tungsten layer 94 is etched back leaving tungsten grid lines 96 and a tungsten peripheral line 98 in place. Then, the titanium nitride film (not shown) is removed from the silicon carbide layer 92. The inherent roughness of the tungsten layer 94 is transferred through to the silicon carbide layer 92 upon removal by dry etching of the tungsten layer 94 and underlying titanium nitride film. The result leaves the silicon carbide layer 92 with a rough top surface 100.

Figure 8:
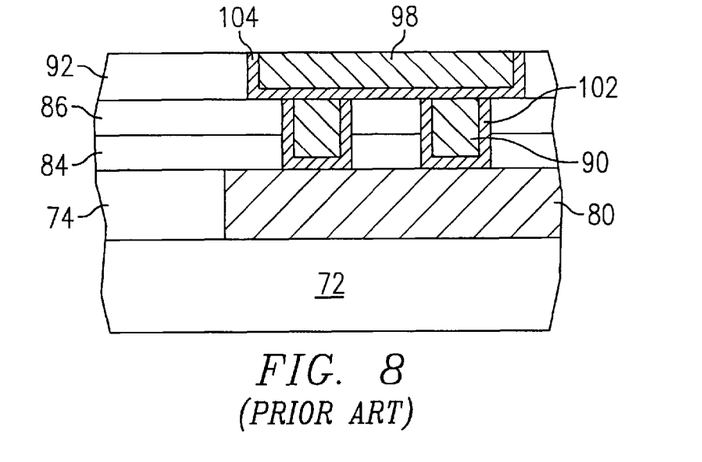
FIG. 8 is an enlarged view of a portion of FIG. 7 showing additional structural details.

FIG. 8 is an enlarged view of a portion of FIG. 7 showing the tungsten line 98 and its connection to the aluminum ground line 80 through intermediate conductive structures. Shown greatly exaggerated in thickness are titanium nitride films 102 and 104, which were mentioned above but not shown in the previous figures.

Figure 9:
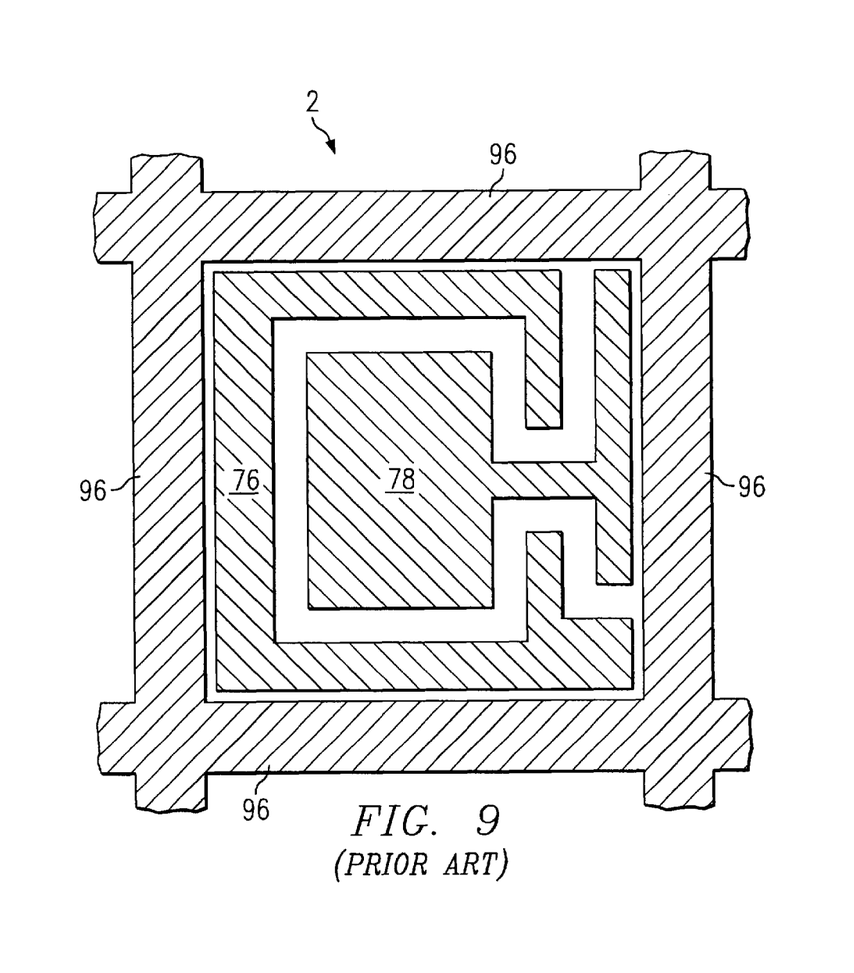
FIG. 9 is a schematic plan view of the layout of the capacitor plates of one sensor cell(overlying insulating layers not shown)

FIG. 9 shows the preferred layout of one capacitive sensor cell 2, which includes separate capacitor plates 76 and 78. The first capacitor plate 76 is C-shaped and the second capacitor plate 78 has portions within and outside of the C-shaped first plate 76. Tungsten grid lines 96 are shown surrounding the sensor cell 2. This pattern is repeated throughout the array 3 of cells described above with reference to FIG. 1. For simplicity of illustration, the grid lines 96 are shown as single lines forming a square around the sensor cell 2 of FIG. 9. Preferably, however, the grid lines 96 are actually more complex in their layout, as will now be described.

Figure 10:
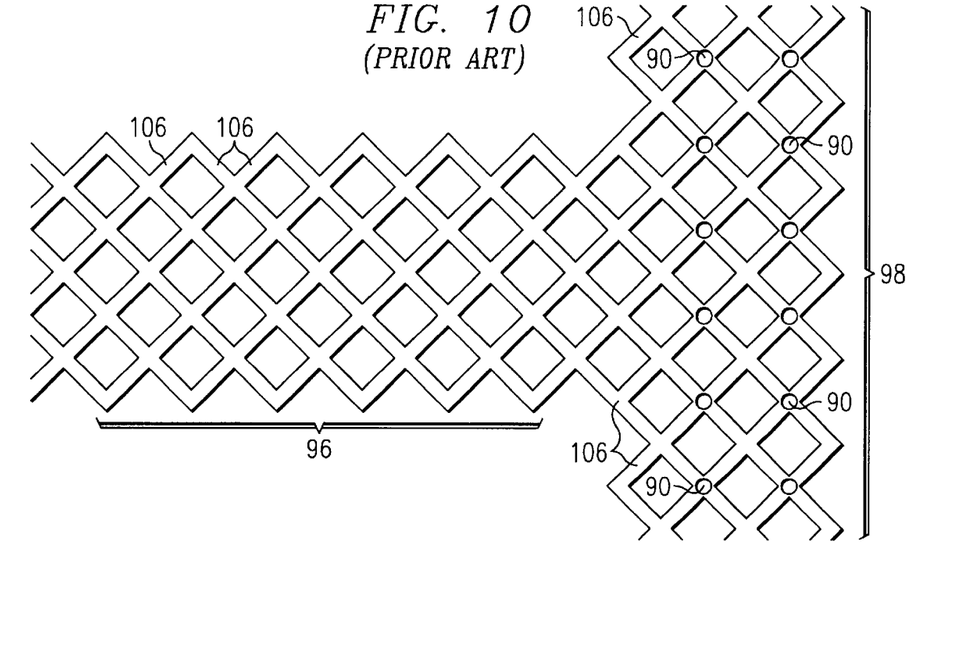
FIG. 10 is an enlarged plan view of a portion of a tungsten lattice used in the device of FIG. 1.

FIG. 10 shows an enlarged plan view of a portion of a grid line 96 and a portion of a peripheral line 98, each of which is laid out as a lattice or network of diagonally crossing microlines 106. Each microline 106 is approximately one micron in width. Within the lattice of the peripheral line 98 and therebelow are the previously mentioned tungsten plugs 90, which are depicted schematically as circles at spaced intersections of selected microlines 106. A plurality of parallel rows of tungsten plugs 90 are used, two being shown, but as many as five rows of staggered plugs being employed in practice.

The process steps described above are well known in the art of semiconductor fabrication. The resulting structures described above are also in the prior art and have been in use in commercial products for more than one year before the filing of this application. The invention described below provides an improvement in the fabrication of fingerprint detectors and in their reliability and performance.

SUMMARY OF THE INVENTION

It has been discovered that the rough surface of the silicon carbide layer used in prior art fingerprint detectors is capable of being damaged by scratching with fingernails or other relatively hard objects. A method has been devised to provide a smooth surface that resists scratching. The method steps include depositing an oxide layer on the surface of the device to fill cavities in the rough surface of the silicon carbide layer, and then removing most of the deposited oxide by chemical mechanical polishing. This leaves a smooth surface with oxide filling the cavities between high points of the silicon carbide surface.

DETAILED DESCRIPTION OF THE INVENTION

Figure 11:
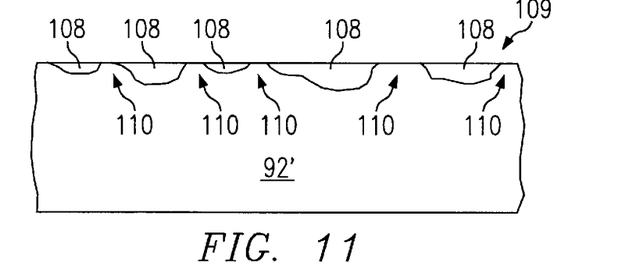
FIG. 11 is a greatly enlarged cross section of a top surface portion of an improved sensor device according to the present invention.

In accordance with the present invention, the durability and reliability of the above-described fingerprint detector is improved by additional processing, as described below. FIG. 11 is a greatly enlarged view of a portion of silicon carbide layer 92', which is similar to previously described silicon carbide layer 92 of FIG. 7. Added to the previously described structure are silicon oxide fillings 108 that fill in cavities in the rough top surface of silicon carbide layer 92'. The cavities are very small, typically having a maximum lateral dimension of about 150 Å and a maximum depth of about 100 Å. The resulting structure has a smooth top surface 109 consisting of silicon carbide at random high points 110 and silicon oxide fillings 108 in the cavities therebetween.

Figure 12:
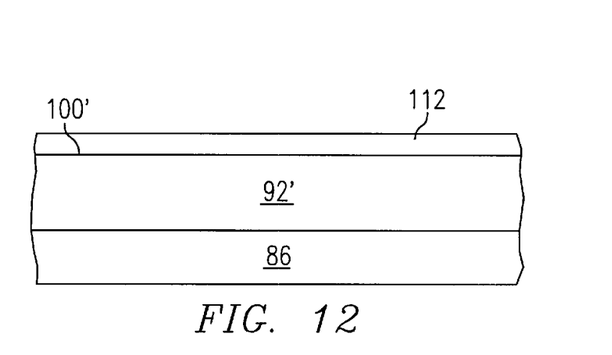
FIG. 12 is an enlarged cross section of the improved sensor device showing the top layers just prior to the final step of the improved process of the present invention.

The preferred method of producing the smooth top surface 109 proceeds with the method steps described above in connection with FIGS. 3–8 with the following additional steps. A silicon oxide layer 112 is deposited on the rough top surface 100' of the silicon carbide layer 92' to produce the structure shown in the enlarged partial view of FIG. 12. Preferably, the oxide layer 112 is at least about 250 Å, which is more than adequate to fill the cavities in the top surface of the silicon carbide layer 92'. A conventional chemical vapor deposition (CVD) process is used to deposit the oxide layer 112. This is performed at a relatively low temperature between 360° C. and 400° C., preferably at about 380° C.

Then, using chemical mechanical polishing (CMP), most of silicon oxide layer 112 is removed to produce the structure that is partially shown in the greatly enlarged view of FIG. 11. In practice the thickness of oxide layer 112 will be determined by the requirements of the CMP procedure, which may need to operate for a minimum time for consistent results. The preferred slurry used in this CMP step is Klebosol®, which can be purchased from Rodel, Inc. of Phoenix, Ariz.

It will be appreciated from the foregoing description that the addition of oxide fillings 108 in the cavities greatly improves the ability of the device to resist damage from scratching. The cavities themselves are much smaller than the dimensions of the edge of a fingernail or other object that typically might contact the sensor surface 109. Thus, the oxide will stay lodged in the cavities and will present a smooth, scratch-resistant surface to the user.

Additionally, it will be appreciated that the sensitivity of the capacitive difference measurements will improve with the inclusion of the oxide fillings 108 in the cavities in the top surface of the silicon carbide layer 92' due to the change in the dielectric composition of the capacitors. In other words, removal of the air volumes of the cavities between the sensor surface and the ridges and valleys of a fingerprint of a user will increase the capacitance values and the ability to detect small differences in capacitance measurements.

Although the preferred embodiment has been described in detail, it should be understood that various changes, substitutions and alterations can be made therein without departing from the spirit and scope of the invention as defined by the appended claims.

What is claimed is:

1. A fingerprint detector device comprising:

a semiconductor substrate;

an array of capacitive sensor cells formed on the semiconductor substrate;

a tungsten grid having grid lines surrounding each sensor cell and having a peripheral ground line;

a silicon carbide layer disposed above the sensor cells, the tungsten grid being embedded in the silicon carbide layer and having exposed surface portions for contacting a fingerprint pressed against the detector device, the silicon carbide layer including cavities at the top surface; and silicon oxide fillings filling in the cavities in the top surface of the silicon carbide layer, the silicon oxide fillings and silicon carbide layer providing a smooth top surface for the device for contact by a fingerprint of a finger.

2. The fingerprint detector of claim 1 wherein the silicon carbide layer is part of a stacked arrangement of dielectric layers supported by the simiconductor substrate, and wherein the capacitive sensor cells include metal capacitor plates embedded in an intermediate dielectric layer of the stacked arrangement.

3. The fingerprint detector of claim 2 wherein the metal capacitor plates of each capacitive sensor cell are two in number and are coplanar.

4. The fingerprint detector of claim 3 wherein the one of the two metal capacitor plates of each sensor cell is generally C-shaped and the other of the two metal capacitor plates has portions within and outside of the C-shaped plate.

5. The fingerprint detector of claim 4 wherein the metal capacitor plates each consists essentially of aluminum.

6. A method of making a fingerprint detector comprising:

providing a semiconductor substrate with transistor regions defined therein;

forming conductive layers above the substrate to interconnect the transistors;

forming a planarized insulating layer above the conductive layers;

defining coplanar capacitor plates on the planarized insulating layer with vias through the planarized insulating layer to portions of the conductive layers therebelow;

depositing a silicon carbide layer above and insulated from the capacitor plates;

defining openings within the silicon carbide layer;

depositing a titanium nitride film on the silicon carbide layer and within the openings therein;

depositing a tungsten layer on the titanium nitride layer;

selectively etching back the tungsten layer to remove the tungsten except within the openings;

removing the titanium nitride above the surface of the silicon carbide layer leaving cavities in the top surface of the silicon carbide layer;

depositing a thin oxide layer on the silicon carbide layer and within the cavities; and removing portions of the thin oxide layer by chemical mechanical polishing down to high points of the silicon carbide layer and leaving oxide in the cavities so that the remaining oxide and high points of the silicon carbide layer define a smooth surface for contact by a fingerprint of a finger.

7. The method of claim 6 wherein the thin oxide layer is deposited by chemical vapor deposition at a temperature of between about 360° C. to about 400° C.

8. The method of claim 7 wherein the thin oxide layer is deposited to a thickness above the silicon carbide layer of at least about 250 Å.

9. The method of claim 6 wherein tungsten plugs are formed beneath the tungsten layer within the openings to provide connection to a metal ground line therebelow.

10. The method of claim 9 wherein the capacitor plates are formed by depositing a metal layer and selectively removing portions of the metal layer to define the capacitor plates and the metal ground line during the same sequence of steps.

* * * * *